Oct. 14, 1924.                                              1,511,905
                        J. F. OLDHAM
                    ROLLER OR BALL BEARING
                  Original Filed Aug. 29, 1921

J. F. Oldham, Inventor

By C. A. Snow & Co.
            Attorneys

Patented Oct. 14, 1924.

1,511,905

UNITED STATES PATENT OFFICE.

JOSEPH F. OLDHAM, OF HORSE SHOE BOTTOM, KENTUCKY.

ROLLER OR BALL BEARING.

Continuation of application Serial No. 496,407, filed August 29, 1921. This application filed April 22, 1924. Serial No. 708,242.

*To all whom it may concern:*

Be it known that I, JOSEPH F. OLDHAM, a citizen of the United States, residing at Horse Shoe Bottom, in the county of Russell and State of Kentucky, have invented a new and useful Roller or Ball Bearing, of which the following is a specification.

This invention relates to wear compensating devices and constitutes a continuation of my application filed in the Patent Office under date of August 29, 1921, and bearing Serial Number 496,407.

The primary object of the invention is to provide novel means for automatically compensating for wear between the bearings of a wheel to insure against the wheel wabbling or moving out of alignment, when the bearings become worn.

Another important object of the invention is to provide means for locking the bearings in their positions of adjustment to eliminate any possibility of the bearings moving after an adjustment has been automatically made.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
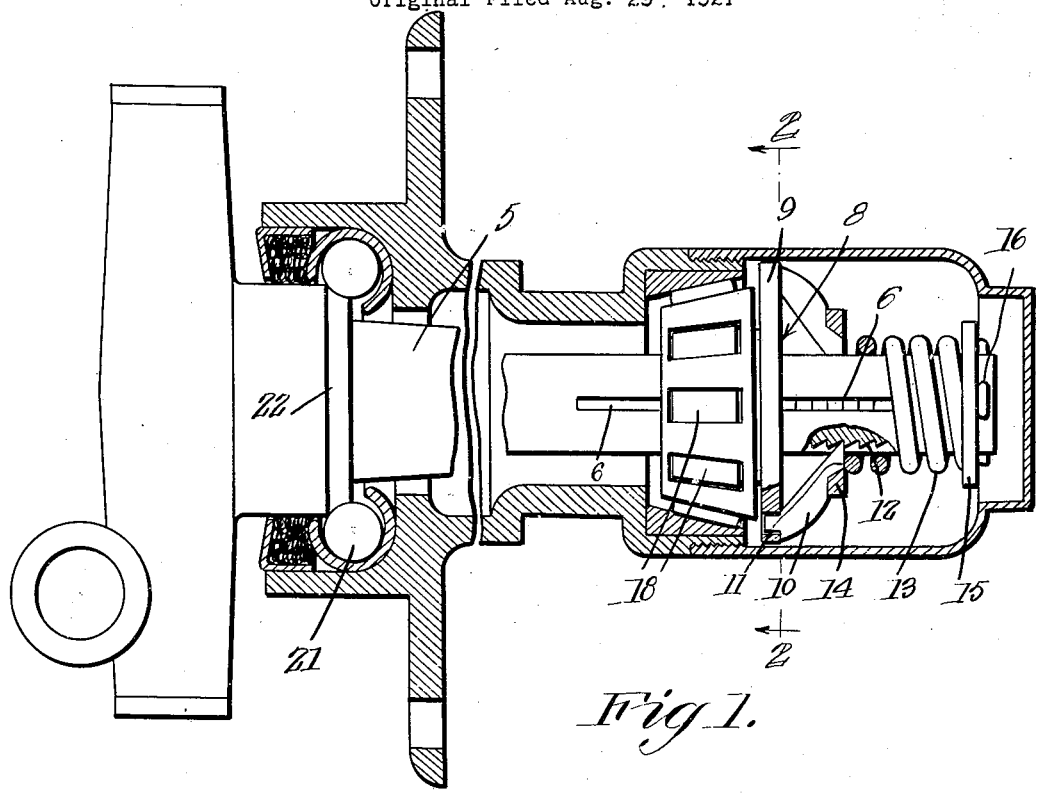
Figure 1 is a sectional view through a wheel hub disclosing the bearings and adjusting means as supported therein.
Figure 2:
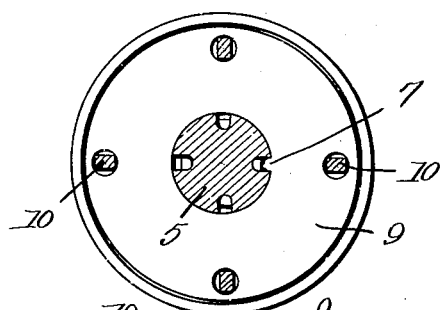
Figure 2 is a sectional view taken on line 2—2 of Figure 1.
Figure 4:
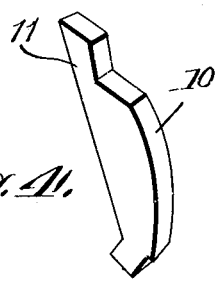
Figure 4 is a perspective view of one of the adjusting arms.
Figure 3:
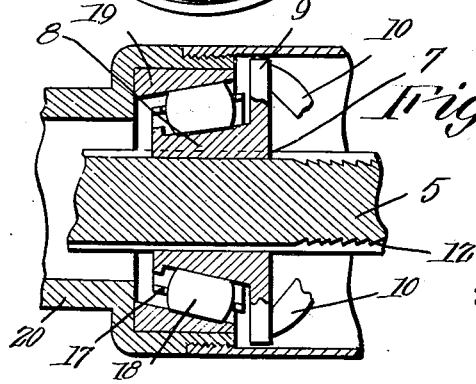
Figure 3 is a fragmental sectional view through the axle and roller cage.

Referring to the drawing in detail, the reference character 5 indicates a spindle which is provided with key-ways 6 to accomodate the key 7 formed integral with the bearing member 8, which is mounted on the spindle against rotation.

This bearing member 8 includes a flange 9 formed with openings to accommodate the upper ends of the adjusting arms 10 that have their lower ends offset as at 11 to engage within the notches 12 formed in the spindle so that as the bearing 8 is moved along the spindle, the arms will engage within the notches and hold the bearing against reverse movement.

Positioned on the spindle 5 adjacent to the outer end thereof, is a coiled spring 13, which spring has one end thereof abutting against the ring member 14 that embraces portions of the offset ends 11 of the arms 10 to hold the arms 10 in their assembled relation, it being understood that these arms are disposed in spaced relation with each other around the spindle 5. It might be further stated that the notches 12 are formed in the bottom walls of the key-ways 6, so that the side edges of the offset portions 11 of the arms 10 will be restricted against lateral movement with respect to the spindle 5.

The outer end of the coiled spring 13 engages the washer 15, the spring being held under tension by engagement with the washer 15, which washer is held to the spindle 5, by means of the cotter pin 16 that extends transversely through the spindle.

Mounted on the bearing 8 is a roller cage 17 in which the rollers 18 are positioned, the rollers also engaging the bearing member 19 mounted within the hub 20 of the wheel whereby as the roller bearings 18 wear, the pressure of the spring 13 against the arms 10 will act to move the bearings and compensate for such wear to the end that a close-fit is maintained between the bearings of the wheel.

Supported at the inner end of the wheel hub are the usual roller bearings 21 that operate on the cone 22 in the usual manner.

When the bearings become worn, it is obvious that the coiled spring 13 will force the roller cage inwardly compensating for such wear, the arms 10 dropping within the notches 12 to hold the bearings in their positions of adjustment.

I claim:—

1. In a device of the character described, a spindle having key-ways, said key-ways having notches, an adjustable bearing member on the spindle, arms engaging the adjustable bearing member and engaging the notches of the key-way to restrict movement of the adjustable bearing member in one direction, a roller bearing cage on the bearing member, and resilient means on the spindle and engaging the arms for moving the adjustable bearing member longitudinally of the spindle.

2. In a device of the character described, a spindle, an adjustable bearing member on the spindle, a roller cage mounted on the bearing member, arms engaging the bearing member, a coiled spring mounted on the spindle and engaging the arms for normally urging the bearing member towards one end of the spindle, and means for securing the coiled spring to the spindle.

3. In a device of the character described, a spindle, said spindle having key-ways formed therein, a bearing member mounted on the spindle, said bearing member having a flange, arms engaging the flange and moving in the key-ways, means in the key-ways and engaging the arms for restricting movement of the arms and bearing member in one direction, and pressure controlled means on the spindle and engaging the arms for normally urging the bearing member longitudinally of the spindle.

In testimony that I claim the foregoing as my own, I have hereto affixed my signature in the presence of two witnesses.

JOSEPH F. OLDHAM.

Witnesses:
WM. J. CHUMBLEY,
K. S. LESTER.